United States Patent Office 2,766,221
Patented Oct. 9, 1956

2,766,221

SYNTHETIC FIBER-FORMING POLYMERS FROM META-XYLYLENE DIAMINE AND ADIPIC ACID

Funston G. Lum and Earl F. Carlston, Richmond, and Judson C. Butler, El Cerrito, Calif., assignors to California Research Corporation, San Francisco, Calif., a corporation of Delaware No Drawing. Application June 4, 1953,
Serial No. 359,632

1 Claim. (Cl. 260—78)

This invention is directed to novel synthetic fiber-forming polymers. More particularly, the invention concerns novel superpolyamides suitable for the production of superior synthetic fibers.

High molecular weight superpolyamides useful in the preparation of synthetic fibers are known to the art. These superpolymers are generally defined as being characterized by a molecular weight greater than 10,000 and a crystalline structure which may be oriented by cold drawing filaments thereof to improve their tensile strength and pliability.

Probably the most widely recognized fiber-forming superpolyamides today are the highly polymeric linear condensation products of diamines and dicarboxylic acids known generically as nylon. Ordinarily, only aliphatic diamines and aliphatic dicarboxylic acids are employed in their preparation.

Polymers of a few aromatics such as para-xylylene diamine and terephthalic acid having amino and carboxyl groups in the para positions in the interests of symmetry have also been tried. It has been generally assumed that symmetry is all important in the production of crystalline high molecular weight polymers which can be spun and cold drawn to give strong fibers and that the meta-isomers inherently would give polymers which were insufficiently linear and amorphous in nature. A good example of this assumption may be found in the authoritative article by Hill and Walker entitled "Polymer Constitution and Fiber Properties" which appeared in the Journal of Polymer Science for October 1948, vol. 3, No. 5. In this article the results of tests showing the effect of aromatic groups on polyesters were reported with a conclusion that "the effects of lack of symmetry are startling" (pages 619–620).

Although the art as discussed above would lead one to believe that polymers of reactants lacking in symmetry are inherently amorphous and poor fiber-formers, we have now discovered a novel class of crystalline superpolyamides of meta-xylylene diamine and an aliphatic dicarboxylic acid of an even number of 6 to 10 carbon atoms which are superior synthetic fiber-forming linear polymers.

The superpolyamides according to our discovery may also be described as possessing recurring units of the structural formula:

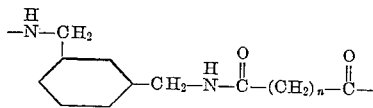

in which $n$ is an even number from 4 to 8.

The novel superpolyamides of the invention as described above, although characterized by unsymmetrical meta-isomer groups, surprisingly possess an excellent crystalline structure. They can be oriented by cold drawing to produce unusually superior synthetic fibers. This is remarkable because, as already stated, the presence of meta-isomer groups has heretofore been assumed to result in polymers which were too amorphous and insufficiently linear for satisfactory synthetic fiber production. It is even more remarkable in view of the fact that the closely related superpolyamides of meta-xylylene diamine and aliphatic dicarboxylic acids of an odd number of carbon atoms, as hereinafter disclosed, are amorphous in nature and result in products lacking in crystallinity as indicated by their clear, transparent appearance.

Another important and unusual characteristic of the novel superpolyamides according to the invention is that they have melting points above 170° C. and correspondingly high heat distortion points. These points are of great importance in being sufficiently high to give synthetic fibers which are stable at the temperature of boiling water and other conventional laundering temperatures, yet not so high as to render the fibers unsuitable for mechanical operations involved in the formation of synthetic fibers. It is surprising to find that the superpolyamides of meta-xylylene and aliphatic dicarboxylic acids of 6 to 10 carbon atoms possess such high melting and heat distortion points since hexamethylene isophthalamide, having exactly the same configuration in reverse as respects the amide group, is characterized by a much lower melting point and heat distortion point as well as an amorphous structure.

In accordance with the invention, the novel superpolyamides are prepared essentially by condensing meta-xylylene diamine and an aliphatic dicarboxylic acid of 6 to 10 carbon atoms to produce a high polymer. This may be accomplished by heating the diamine and the acid in a reaction vessel from which the water formed in the condensation reaction is removed by distillation or other suitable means. For present purposes a three-step procedure is preferred involving (1) formation of an aqueous nylon salt, (2) separation of the salt or heating of the water and salt to evaporate the water and form a low polymer, and (3) polymerization of the salt or further polymerization of the low polymer to a high polymer.

Nylon salts of meta-xylylene diamine and aliphatic dicarboxylic acids of 6 to 10 carbon atoms according to the invention may be prepared by neutralizing the diamine in water with the dibasic acid to form an aqueous nylon salt solution. Approximately equimolecular proportions of acid and diamine are employed.

The nylon salts formed in the above reaction may be precipitated and separated by several means. A lower molecular weight alcohol such as isopropanol may be added to precipitate the salt or the solution may be cooled. The precipitated nylon salts may be separated by any suitable means for separating solids and liquids such as filtration, centrifuging, etc.

According to another method the aqueous nylon salt solution may be heated at atmospheric pressure to remove the water and at the same time form an initial low polymer. This method is preferred in practice since it avoids the use of separation equipment and facilitates the handling of materials by keeping them in liquid form.

The polymerization of the nylon salt of meta-xylylene diamine and aliphatic dicarboxylic acid pursuant to the invention is effected by heating the salt to the temperature at which condensation occurs to form a highly polymeric product. An inert atmosphere such as nitrogen gas is desirable in this operation. After the initial formation of a low polymer the polymerization is most conveniently continued by heating at reduced pressures of 40 millimeters of mercury or less. Temperatures in the range of 240 to 280° C. and pressures of 0.01 to 0.1 millimeter mercury are preferred.

The meta-xylylene diamine may be derived from several sources. For present purposes it was very conveniently and economically prepared from isophthalonitrile by hydrogenation. It has the following structural formula which clearly shows its characteristic lack of symmetry:

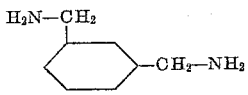

The aliphatic dicarboxylic acid of from 6 to 10 carbon atoms employed in the preparation of the superpolyamides of meta-xylylene diamine according to the invention preferably are alpha- and omega-aliphatic dicarboxylic acids, that is, those having the two carboxyl groups on the ends of the carbon chain. These acids may also be described as polymethylene dicarboxylic acids of 6 to 10 carbon atoms. They may be represented by the following structural formula:

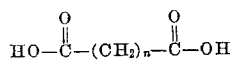

in which $n$ is 4 to 8. Dicarboxylic acids within the above-described preferred group are adipic acid, pimelic acid, suberic acid, azelaic acid, and sebacic acid. Of these acids sebacic, suberic and, particularly, adipic acid are presently considered the most suitable because of the excellent crystalline characteristics and high melting points of the meta-xylylene diamine superpolyamides derived from them.

The following examples are offered in illustration of the invention, but are not to be considered a limitation thereof. Unless otherwise specified, the proportions given are on a weight basis.

*Example 1*

An aqueous nylon salt solution was prepared by adding 5.1 parts by weight of adipic acid to a mixture of 4.75 parts of meta-xylylene diamine and 55 parts of water. 235 parts by weight of isopropanol were added to this solution to precipitate the nylon salt and the salt was separated by filtration. 12.4 parts of wet nylon salt were recovered in this operation and were charged to a glass reaction flask. The salt was heated slowly under an inert atmosphere of nitrogen to 260° C. and maintained at this temperature for 4 hours to form a low polymer. When the polymerization was continued for an additional hour at 0.01 to 0.1 mm. mercury pressure, a very viscous, highly polymeric meta-xylylene adipamide was formed having a molecular weight of about 10,000 to 12,000.

The meta-xylylene adipamide superpolymer possessed an excellent crystalline structure. It had a melting point of 243° C. Filaments were formed from it which were cold drawn 400 to 500% at 60 to 80° C. to produce fibers having excellent tensile strength.

*Example 2*

10.4 parts of meta-xylylene diamine were dissolved in 43 parts of water and 11.2 parts of adipic acid were added. The nylon salt solution thus formed was charged to a glass reaction flask. Water was distilled off and the salt was converted to a low polymer by heating the solution slowly under an inert atmosphere of nitrogen to about 260° C. The polymerization was continued for an additional half hour at 0.01 to 0.1 mm. mercury pressure to give a highly polymeric meta-xylylene adipamide having a molecular weight of about 10,000 to 12,000.

The product possessed a definite crystalline structure and was found to be very suitable for the production of high-tenacity fibers.

*Example 3*

15.5 parts of sebacic acid were added to an aqueous solution of 10.4 parts of meta-xylylene diamine and 50 parts of water. The aqueous slurry of nylon salt thus formed was charged to a glass reaction flask. The slurry was heated slowly to 260° C. under an inert atmosphere of nitrogen to distill off the water and convert the salt to a low polymer. The heating was continued for an additional half hour at 0.01 to 0.1 mm. of mercury pressure to form a high molecular weight superpolymer.

The product consisting of a high polymeric meta-xylylene sebacamide possessed a melting point of about 190° C. and was markedly crystalline in nature.

*Example 4*

10.4 parts of meta-xylylene diamine were dissolved in 40 parts of water and 14.4 parts of azelaic acid were added to the solution to form a solution of nylon salt. The solution was then charged to a glass reaction flask wherein the water was distilled off and the salt converted to a low polymer by heating slowly to 260° C. under an inert atmosphere of nitrogen. The polymerization was continued for an additional half hour at 0.01 to 0.1 mm. of mercury pressure to form a superpolymer.

The superpolymer of meta-xylylene diamine and azelaic acid formed above was characterized by an amorphous, non-crystalline structure, as indicated by its clear, transparent nature. It had a melting point of about 172° C.

*Example 5*

A meta-xylylene diamine pimelate salt solution was formed by adding 12.3 parts of pimelic acid to a solution of 10.4 parts of meta-xylylene diamine in 30 parts of water. The salt solution was charged to a glass reaction flask. The mixture was heated slowly under an inert atmosphere of nitrogen to 260° C. to distill off the water and form a low polymer. The polymerization was continued for an additional half hour at 0.01 to 0.1 mm. mercury pressure to give the superpolymer of meta-xylylene diamine and pimelic acid.

The product was amorphous and lacked crystallinity as indicated by its clear, transparent appearance. Although it had a melting point of about 192° C., the fibers produced from it were found to be incapable of withstanding boiling water.

The unusual nature of the superpolymer of meta-xylylene diamine and an aliphatic dicarboxylic acid of 6 to 10 carbon atoms in accordance wtih the present invention is clearly demonstrated by the above examples. For no explainable reason the meta-xylylene superpolyamides of aliphatic dicarboxylic acids having an even number of carbon atoms are decidedly crystalline in nature whereas the closely related homologues with acids of an odd number of carbon atoms are amorphous. In addition to the foregoing distinctions it will also be noted that all of the superpolyamides of the invention, both odd and even numbered carbon atom acids, are characterized by unusually high melting points of above 170° C. which would not be predicted for such unsymmetrical structures containing meta-isomer groups in the molecule.

In addition to being excellent fiber-forming materials the superpolyamides of the invention are also useful in the production of films, molded articles, and the like, wherein synthetic plastics are conventionally employed. The superpolymers of meta-xylylene diamine and aliphatic dicarboxylic acids of an odd number of 6 to 10 carbon atoms (that is, 7 and 9) are particularly suitable for the manufacture of clear plastic materials such as films and molded articles in which transparency as well as high melting and high heat distortion characteristics are much sought after.

We claim:

A crystalline meta-xylylene adipamide superhomopolymer.

(References on following page)

References Cited in the file of this patent

UNITED STATES PATENTS

| | | |
|---|---|---|
| 2,130,523 | Carothers | Sept. 20, 1938 |
| 2,244,192 | Flory | June 3, 1941 |
| 2,252,554 | Carothers | Aug. 12, 1941 |
| 2,277,125 | Martin | Mar. 24, 1942 |
| 2,640,080 | De Tar et al. | May 26, 1953 |

OTHER REFERENCES

Hill et al.: J. Polymer Science, vol. 3, October 1948, pages 609–615.

Ruggli: Helvetica Chimica Acta, vol. 30, pages 1845, 1848, 1849, 1947.